(No Model.) 2 Sheets—Sheet 1.
W. A. MILES.
CONDENSER FOR STEAM ENGINES.
No. 280,213. Patented June 26, 1883.
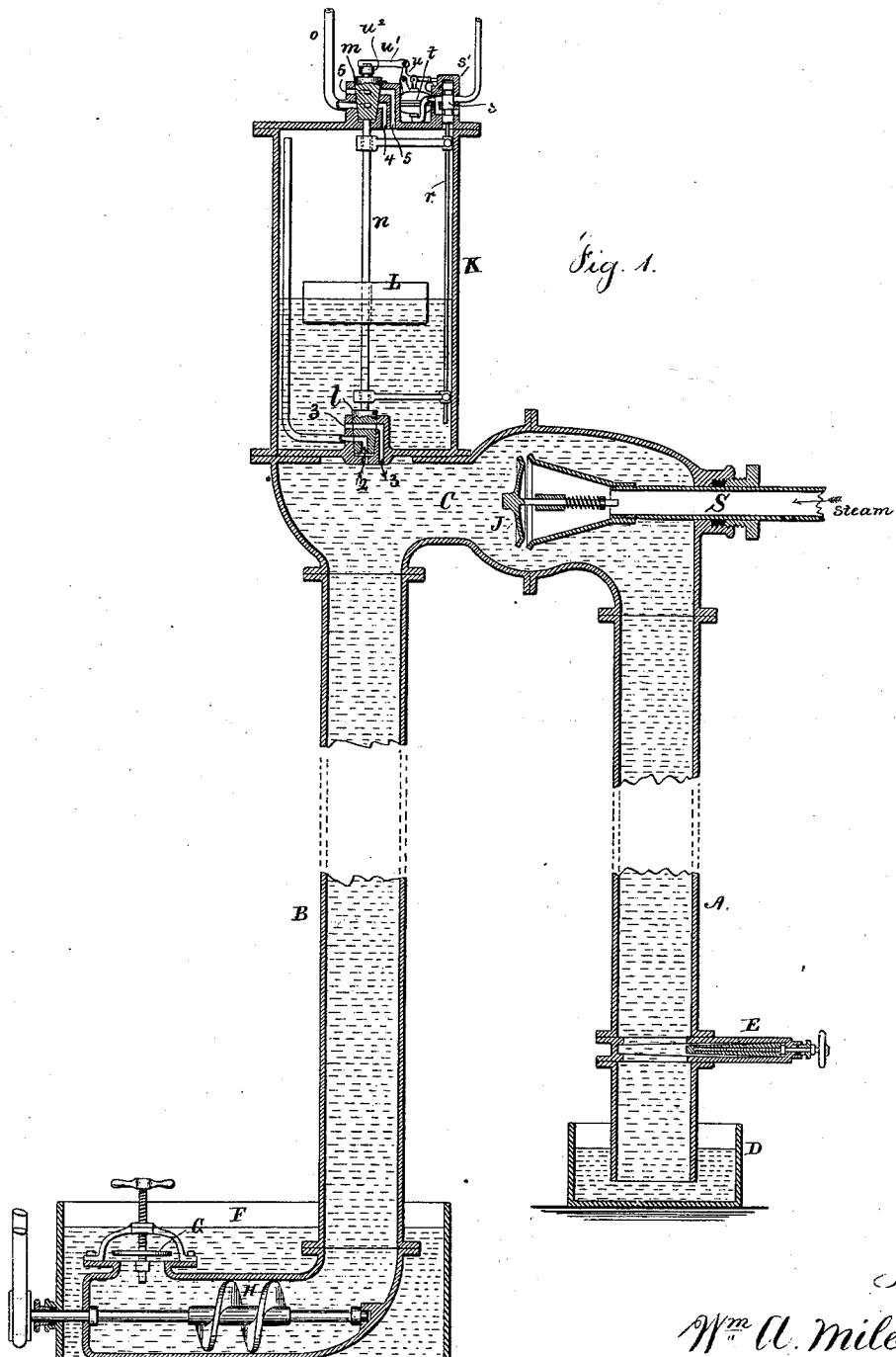
Fig. 1.
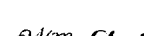

(No Model.) 2 Sheets—Sheet 2.
W. A. MILES.
CONDENSER FOR STEAM ENGINES.
No. 280,213. Patented June 26, 1883.
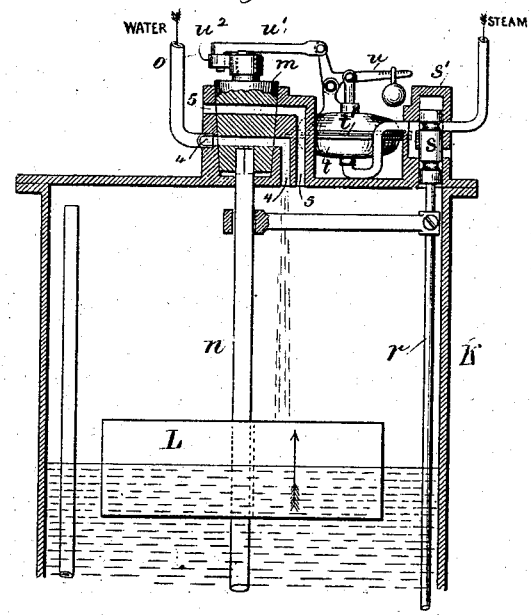
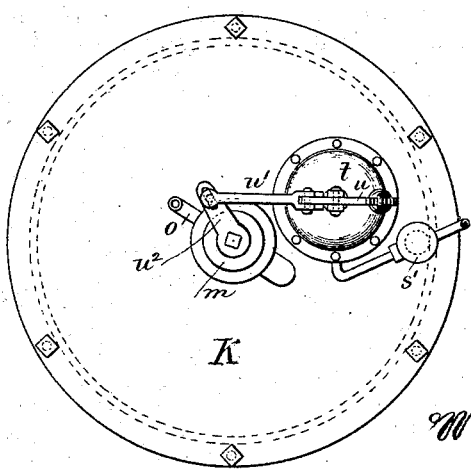

UNITED STATES PATENT OFFICE.

WILLIAM A. MILES, OF COPAKE IRON WORKS, NEW YORK.

CONDENSER FOR STEAM-ENGINES.

SPECIFICATION forming part of Letters Patent No. 280,213, dated June 26, 1883.

Application filed January 19, 1883. (No model.)

*To all whom it may concern:*

Be it known that I, WILLIAM A. MILES, of Copake Iron Works, in the county of Columbia and State of New York, have invented an Improvement in Condensers for Steam-Engines, of which the following is a specification.

In my improvement the water is caused to flow gradually through a siphon-pipe and discharge at the longer leg. Thereby there will be a vacuum in the upper portion of the siphon in proportion to the length of the delivery-leg. The steam from the engine is discharged into the water at the top part of the siphon and is condensed; and I use an automatic trap for taking off air or gases, or any steam that may not condense, and supplying its place with water, so as to maintain the proper vacuum in the siphon.
In the drawings, Figure 1 is a vertical section of the apparatus. Fig. 2 is a section of the cock and valve at top of the air-vessel in larger size, and Fig. 3 is a plan of the upper part of the air-vessel.
A and B are the legs of the siphon, united at their upper ends by the curved pipe or water-way C. The condensing-water is supplied to the lower end of the pipe A by a vessel, D, or other suitable device, and there is a cock or valve, E, in the pipe A, to regulate the amount of water passing in, and also to close the said pipe A in filling the siphon. At the lower end of the pipe B there is a hot-well or water-vessel, F, that retains water and covers the inlet end of the pipe B, so as to exclude the atmosphere. There is also a valve, G, that is operated by a screw or otherwise, to regulate the discharge of the water, and also to close the pipe B in filling the siphon. I have represented at H a screw blade or propeller, that may be revolved gradually by power, to promote a circulation of water in the siphon; but usually this will not be needed. The valves and other parts thus far described may be of any desired or known size or character. The exhaust-steam passes from the engine through the pipe S to the upper part, C, of the siphon, and discharges through openings into the water. These openings may be in a convex head, similar to a rose or sprinkler; but I prefer to use the valve J at the end of the steam-pipe, which opens for the discharge of steam when the vacuum in the siphon is greater than that in the steam-pipe, and closes if the steam condenses in the exhaust-pipe so as to produce a greater vacuum than that in the siphon. This valve may be of any suitable character. I have represented various kinds of valves in applications heretofore made by me for patents in condensers for pumping-engines, and I remark that either of the forms of valve in said applications may be adopted in this apparatus without changing its mode of operation.

It will now be understood that the exhaust-steam, as it is discharged into the water, will be condensed, and there will be as much vacuum as will sustain the column of water in the leg B. I, however, am obliged to discharge air or gases or uncondensed steam in order to maintain the vacuum. This I accomplish automatically by an air-vessel into which the air passes, and from which water runs into the siphon as it is displaced by the air, and said air-vessel is automatically operated, so that when the water has nearly all escaped and its place been filled with air the cocks or valves are moved so as to close the openings into the siphon and admit water to run into the vessel and drive out the air, after which the valves are again changed to open the passages into the siphon and shut the inlet water-way and air-escape. In my application filed December 21, 1882, an air-vessel of this character is shown, which may be employed with the present condensing apparatus. I, however, have improved upon the same in the following particulars:

The air-vessel K is provided with a barrel and tapering plug, $l$, at the bottom, and a similar barrel and tapering plug, $m$, at the top. These plugs are connected by the rod $n$, that is provided with squared ends, that enter similar sockets in the plugs, so that the two plugs turn together. There are double ways through each plug. The way 2 through the plug and barrel $l$ is for the escape of air from the siphon $c$ into the air-vessel K, and the way 3 is for water to run from K into C. In the barrel and plug $m$ there are two ways, 4 and 5—the one for water to run into K from the supply-pipe $o$, the other for air or steam to escape as the water runs in. The plugs $l\,m$ are placed on the stem or rod $n$, so that when the ways 2 and 3 are open the ways 4 and 5 are closed, and by turning the stem to close 2 and 3 the ways 4 and 5 are opened, and the reverse. I move the cocks $l\,m$ automatically by steam-pressure admitted to act upon a flexible diaphragm. The float L is free to rise and fall with the water-level in K, and as the same rises it acts on the rod $r$ to lift the small piston-valve $s$ in the cylinder $s'$, and admit steam-pressure into the chamber $t$ beneath the flexible diaphragm $t'$, and when the float descends and rests upon a tappet or arm of the rod $r$, it moves the piston-valve $s$ the other way and relieves the pressure and allows the flexible diaphragm $t'$ to move the other way. I remark that this flexible diaphragm and chamber are similar to an ordinary steam-diaphragm, and the connection from the same to the stem of the cocks $l\,m$ may be of any desired character. I have shown the bent lever and weight $u$ to act upon the disk and stem above the diaphragm in the opposite direction to the steam-pressure, and a link, $u'$, to the arm $u^2$ at the upper end of the valve-stem, the parts being proportioned so as to give the required partial rotation to the plugs $l\,m$ in working same to admit the air from the siphon into the vessel K as the water runs out of said vessel, and then to close the passages 2 and 3 automatically as the float descends, and then to turn the cock the other way as the vessel K is again filled with water and the float rises.

It is not necessary that the delivery-leg of the siphon be longer than the inlet-leg, because the revolution of the propeller will cause a circulation of the water through such siphon.

In my Patents Nos. 271,096 and 271,097 the condenser-siphon forms part of the suction-pipe of a pump, and the operation performed is dependent upon the suction action of said pump. In my present improvement the pump is not employed, and the vacuum is maintained by the column of water, and the circulation results from one leg of the siphon being longer than the other, or from the movement of the propeller, the discharge-vessel F being always needed to prevent air passing into the siphon.

I claim as my invention—

1. The combination, with the siphon A B C, of a water-supply, D, a discharge-vessel, F, at the lower end of the siphon-leg B, and an exhaust-steam pipe opening into the upper part of the siphon, substantially as set forth.

2. The siphon A B C, water supply and discharge devices, in combination with the valves E G and exhaust-steam pipe, substantially as set forth.

3. In a condensing apparatus operated without a pump, the combination, with the siphon A B C and water supply and discharge vessel, of the exhaust-steam pipe passing into the upper part of the siphon, an air-vessel above the siphon, and automatic devices, substantially as set forth, for allowing air to escape from the siphon as water is discharged from the air-vessel, and then for admitting water into the vessel and discharging the air, substantially as specified.

4. The combination, with the barrels and plugs $l\,m$, each having air and water passages and a stem connecting them together, of an air-vessel, a float in the same, a steam-valve operated by the float, a case and elastic diaphragm acted upon by pressure, and levers and connections between the diaphragm and the stem of the plugs, substantially as set forth.

5. The combination, with the siphon A B C, the means for supplying water, and the discharge-vessel F, of an exhaust-steam pipe entering the upper part of the siphon and opening in the direction of the flow of the water, and a valve at the end of such pipe, substantially as specified.

Signed by me this 17th day of January, A. D. 1883.

W. A. MILES.

Witnesses:
GEO. T. PINCKNEY,
WILLIAM G. MOTT.